Figure 1:
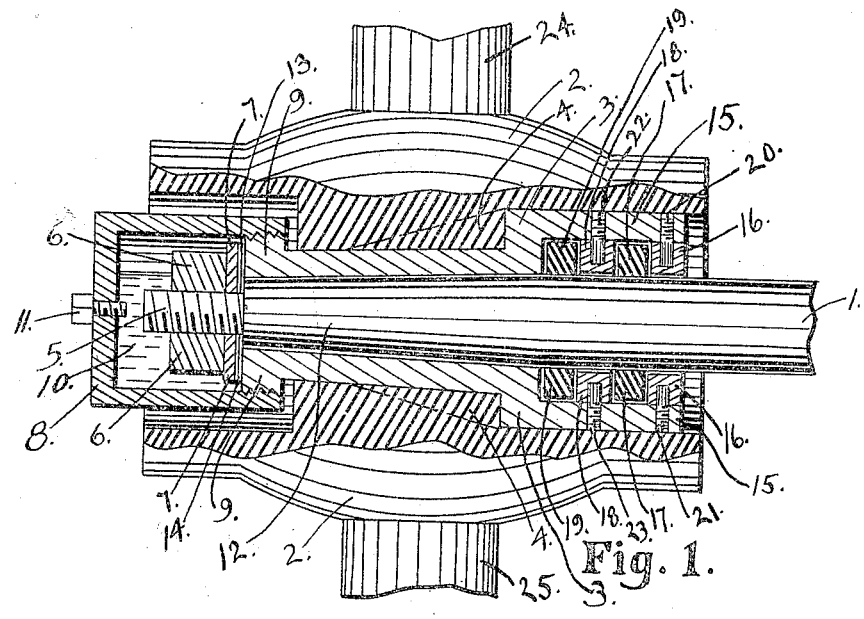

J. E. THEBAUD.
LUBRICANT RETAINER.
APPLICATION FILED MAR. 15, 1909.

958,193.

Patented May 17, 1910.

WITNESSES:
H. C. Nash
H. I. Weed

INVENTOR
John Edward Thebaud

UNITED STATES PATENT OFFICE.

JOHN EDWARD THEBAUD, OF BUFFALO, NEW YORK, ASSIGNOR OF ONE-HALF TO HARRY C. NASH, OF BUFFALO, NEW YORK.

LUBRICANT-RETAINER.

958,193.　　　Specification of Letters Patent.　　Patented May 17, 1910.

Application filed March 15, 1909. Serial No. 483,605.

*To all whom it may concern:*

Be it known that I, JOHN EDWARD THEBAUD, a citizen of the United States, residing at Buffalo, in the county of Erie and State of New York, have invented certain new and useful improvements in lubricant-retainers for rotating and non-rotating contacting bodies, one body terminating within the protected end of the other, such as a vehicle-wheel mounted upon an axle or a car-wheel with its journal and journal-box; and I do hereby declare the following to be a full, clear, and exact description of my invention, such as will enable others skilled in the art to which it appertains to make and use the same, reference being had to the accompanying drawings, and to figures of reference marked thereon, which form a part of this specification.

My invention relates to improvements in lubricant retainers.

The object of my invention is to provide means between the said contacting bodies and at the end of one of the bodies terminating within the other of the said bodies, to prevent the escape of the lubricant.

To that end my invention consists broadly of one or more sets of rings or devices placed between the contacting bodies which form the bearing, and at one end of the contacting surfaces of said bearing and having one or more said rings or devices fixed upon the outer of said bodies, and forming with said bodies, one or more annular spaces or recesses between the said bodies, while allowing a free working fit between the said bodies and between the inner of said bodies and the said rings or devices. I make all joints, between the parts combined to form the said annular spaces or recesses, absolutely lubricant tight. Occupying the said annular space or spaces or recesses, I provide one or more rings or devices adjustably fixed upon the inner of the said bodies and having a free working fit with the outer of said bodies and the said rings or devices thereon; all parts being so arranged that if the lubricant as a film within the space required to form the said working fit should pass out between the said bodies and rings or devices, it would, of necessity, pass around those rings or devices adjustably fixed upon the inner of said bodies, first away from, then parallel with, then toward the axis of rotation and then out from between the said bodies; but in a motion of rotation between the bodies, the said lubricant film, instead of moving toward the axis of rotation and then out from between the said bodies would here be reversed in motion by centrifugal action causing it to move back and away from the axis of rotation and exert a pressure to neutralize any outward movement of the remainder of said lubricant in contact with the said ring or devices, or between the contacting surfaces of said bodies. With the further means which I provide to seal the lubricant within, I have thus entirely prevented the escape of the lubricant and demonstrated the retaining qualities of my invention.

My invention further consists of certain details of construction all of which will be fully hereinafter described and claimed.

Figure 2:
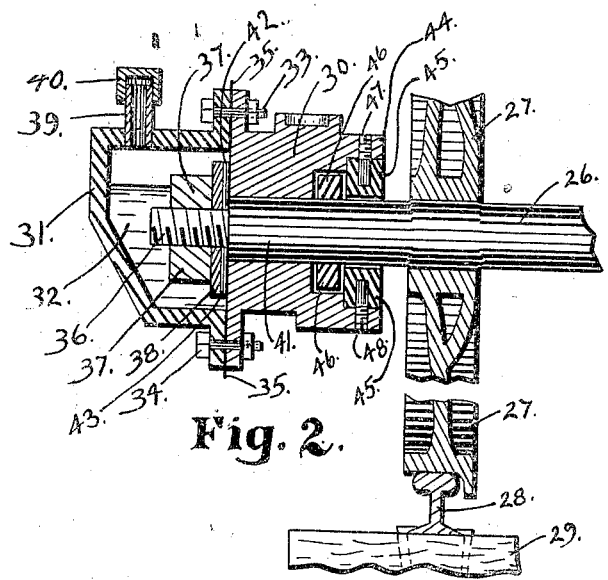

In the drawings, Figure 1 is a longitudinal sectional view of a hub and axle provided with my invention. Fig. 2 is a longitudinal sectional view of a car wheel, journal and journal box, provided with my improved lubricant retainer device.

Referring to the drawings, in Fig. 1, 1 is the axle upon which is mounted the hub 2, provided with the skein 3, which has the usual splines 4. On the threaded end 5 of the axle 1, is screwed the nut 6, there being a washer 7 between the nut 6 and the end 9 of the skein 3. 8 is a cap screwed onto the outer end 9 of the skein 3 and forms a lubricant chamber 10; in the outer wall of which, a plug or stopper 11 closes a hole leading into the chamber 10. To form channels between the lubricant chamber 10 and the bearing surface 12 of the axle 1, I provide radial grooves 13, 14 in the washer 7, between it and the outer end 9 of the skein 3. At and near the inner end 15 of the skein 3, I provide two sets of rings severally numbered 16, 17, 18 and 19. Rings 16 and 18 are fixed within the skein 3 and are free to rotate against the rings 17 and 19 on the axle 1. The rings 17 and 19 are adjustably fixed upon the axle 1 and permit freedom of motion between them and the rings 16 and 18 and the skein 3. As additional security, I provide pins 20 and 21 passing through the skein 3 and into the ring 16, and also pins 22 and 23 passing through the skein 3 and into the ring 18. Upon the hub 2, I have shown fragments of spokes 24 and 25.

In Fig. 2, I have shown a journal 26 passing through wheel 27, standing on a rail 28, which rests upon the tie 29. 30 is a journal bearing or box upon which is secured the lubricant casing 31 forming the lubricant chamber 32. Bolts 33 and 34 pass through flanges upon the box 30 and the lubricant casing 31 and secure between them the gasket 35. On the threaded end 36 of the journal 26 is screwed the nut 37, there being a washer 38 between the nut 37 and the outer end of the box 30. Leading into the lubricant chamber 32, is the pipe 39, having its outer end closed by the cap 40. To form channels between the lubricant chamber 32 and the bearing surface 41, I provide radial grooves 42, 43 in the washer 38, between the said washer and the outer end of the box 30. At and near the inner end 44 of the box 30, I provide the set of rings severally numbered 45 and 46. Ring 45 is fixed within the box 30 and allows freedom of motion between it and the ring 46, which is adjustably fixed upon the journal 26, there being also freedom of motion between the ring 45 and the journal 26, as well as between the ring 46 and the box 30. As additional security, I provide pins 47 and 48 passing through the box 30 into the ring 45.

In construction, the lubricant chambers 10 and 32 effectually seal the lubricant from escape at the outer ends of the respective axle and journal. At and near the inner end 15 of skein 3, the rings 16 and 18 with the skein 3 and the axle 1, as also at and near the inner end 44 of the box 30, the ring 45 with the box 30 and the journal 26 form respective annular spaces occupied by the rings 17 and 19 of Fig. 1, and ring 46 of Fig. 2. All rings 16, 17, 18, 19, 45 and 46 are adjustably forced into their respective positions illustrated in Figs. 1 and 2, but in a manner to allow a free working fit between rotating and non-rotating surfaces to form space for the lubricating film to occupy, as between rings 16 and 17 or between rings 16 and axle 1. The screw pins 20, 21, 22, 23, 47 and 48 are shown to illustrate one form of further securing, in the positions where they have been forced, the rings which these pins respectively penetrate.

In operation, a lubricant is fed into the lubricant chamber and finds its way to the bearing surface between the contacting bodies through channels provided for its passage. In the rotation of the parts the lubricant tends to fly off the rings occupying the said annular space or spaces or recesses and centrifugal action prevents it from backing toward the axis of rotation along the passage out between the contacting surfaces and thus neutralize any movement of the lubricant film which would tend to waste the lubricant from the said contacting surfaces.

In Fig. 1, rings or devices 16 and 17 may be considered as constituting one set, while 18 and 19 constitute another set. Similarly rings or devices 45 and 46 constitute a set illustrated in Fig. 2. Additional sets of rings or devices similar in purpose and form to those referred to in Figs. 1 and 2, may be provided between the contacting, rotating and non-rotating bodies. We may also consider a form of both sets of said rings as disks between whose radial surfaces we have a lubricant film. These disks considered severally in succession along the inner body fit alternately tight and loose upon said inner body while fitting alternately loose and tight upon said outer body in a manner that each disk fits adjustably tight on one and loose on the other of said bodies. The looseness thus formed creates a working fit which when occupied by a lubricant film allows such film to be continuous in form.

The details of construction of the devices shown in the drawings and described in the above specification may be changed as to form of recess or parts combined to make the walls and joints of said annular space or spaces or recesses lubricant tight, as well as to form of rings or devices to wholly occupy the said spaces or recesses with the said lubricant film and yet come within the scope of my invention. Therefore, I do not wish to be confined to the special applications of this lubricant retainer shown in the drawings and described in this specification, hence

I claim—

In a lubricant retainer, rotating and non-rotating members, one surrounding the other and inclosing one end of the inner member, there being one or more annular recesses within and near one end of the outer member, one or more rings adjustably positioned upon the inner member and located in said recesses, the walls of said recesses being lubricant tight and closely enveloping said rings, whereby a lubricant extends from between the bearing surfaces of said members to envelop and contact said ring or rings as a lubricant film, while contacting the inner walls of said recesses, means for supplying the lubricant to the device, one of said members and said ring or rings coöperating with the other of said members to neutralize by centrifugal action the outward movement of the lubricant from between the members, by maintaining the said lubricant film at the ring or rings, substantially as set forth.

JOHN EDWARD THEBAUD.

Witnesses:
F. A. EMBRY,
J. E. O'DONNELL.